United States Patent
Isner

(10) Patent No.: US 7,151,542 B2
(45) Date of Patent: Dec. 19, 2006

(54) MANIPULATION OF MOTION DATA IN AN ANIMATION EDITING SYSTEM

(75) Inventor: Michael Isner, Santa Monica, CA (US)

(73) Assignee: Avid Technology, Inc., Tewksbury, MA (US)

(*) Notice: Subject to any disclaimer, the term of this patent is extended or adjusted under 35 U.S.C. 154(b) by 107 days.

(21) Appl. No.: 10/960,481

(22) Filed: Oct. 7, 2004

(65) Prior Publication Data

US 2005/0041030 A1 Feb. 24, 2005

Related U.S. Application Data

(63) Continuation of application No. 10/264,173, filed on Oct. 3, 2002, now Pat. No. 6,806,879.

(60) Provisional application No. 60/330,136, filed on Oct. 17, 2001.

(51) Int. Cl.
*G06T 15/00* (2006.01)

(52) U.S. Cl. .................. 345/474; 700/260; 700/262

(58) Field of Classification Search ........ 345/473–475; 700/260, 262
See application file for complete search history.

(56) References Cited

U.S. PATENT DOCUMENTS

| | | | |
|---|---|---|---|
| 5,649,133 A | 7/1997 | Arquie | 395/348 |
| 5,758,093 A | 5/1998 | Boezeman et al. | 395/200.79 |
| 6,144,972 A | 11/2000 | Abe et al. | 707/501 |
| 6,388,668 B1 | 5/2002 | Elliot | 345/474 |
| 6,459,439 B1 | 10/2002 | Alquist, Jr. et al. | 345/672 |
| 6,806,879 B1* | 10/2004 | Isner | 345/474 |
| 2003/0085900 A1 | 5/2003 | Isner | 345/474 |

OTHER PUBLICATIONS

Bindiganavale, Ramamani N., "Building Parameterized Action Representations From Observation", A PhD. Dissertation in Computer & Information Sciences, University of Pennsylvania, 2000, pp. iv-110.

Bindiganavale, Rama, et al., "Motion Abstraction and Mapping with Spatial Constraints", Proc. of Int'l Workshop on Modeling and Motion Capture Techniques for Virtual Environments, Captech '98, Nov. 1998, pp. 70-82.

Choi, Kwangjin, et al., "Processing Motion Capture to Achieve Positional Accuracy", Graphical Models and Image Processing, vol. 61, No. 5, 1999, pp. 260-273.

Gleicher, Michael, "Animation From Observation: Motion Capture And Motion Editing", Computer Graphics, vol. 33, No. 4, 1999, pp. 51-54.

(Continued)

*Primary Examiner*—Phu K. Nguyen
(74) *Attorney, Agent, or Firm*—Peter J. Gordon; John A. Hamilton

(57) ABSTRACT

The problem of editing motion data can be solved by providing a way to specify control points (herein called "handles") along the path of the motion data and to describe the motion data as a combination of layers of information describing the motion in relationship to these handles. A first layer may describe, for each point in the motion data, the distance of the point between the handles. For example, a path between two handles may be defined. Each point in the motion data is closest to a point along that path. That point along the line has a distance to the two handles. These distances may be defined as a percentage of the length of the path. A second layer may describe the offset of points in the motion data from the line between the two handles.

66 Claims, 5 Drawing Sheets

OTHER PUBLICATIONS

Gleicher, Michael, "Comparative Analysis of Constraint-Based Motion Editing Methods", Dept. of Computer Science, University of Wisconsin, Jan. 2001, pp. 1-38.

Gleicher, Michael, "Motion Editing with Spacetime Constraints", Proc. of the 1997 Symposium on Interactive 3D Graphics, 1997, pp. 1-10.

Gleicher, Michael, "Motion Path Editing", Computer Science Dept., University of Wisconsin, ACM Symposium on Interactive 3D Graphics, 2001, pp. 195-202.

Gleicher, Michael, et al., "Constraint-Based Motion Adaptation", Apple TR 96-153, Jun. 14, 1996, 1-30.

Kovar, Lucas et al., "Footskate Cleanup for Motion Capture Editing", ACM SIGGRAPH Jul. 2002, pp. 97-104.

Lee, Jehee, et al., "A Hierarchical Approach to Interactive Motion Editing for Human-Like Figures", Proc. SIGGRAPH 1999, pp. 39-48.

* cited by examiner

Motion Layer 1: Positions between Handles

Motion Layer 1 showing plotted percentages of the constraints between handles

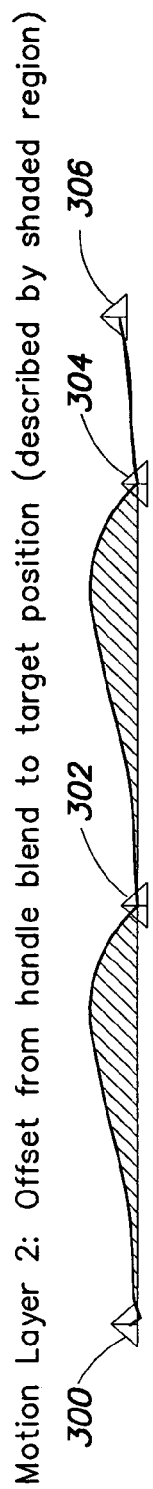
FIG. 6 Motion Layer 2: Offset from handle blend to target position (described by shaded region)
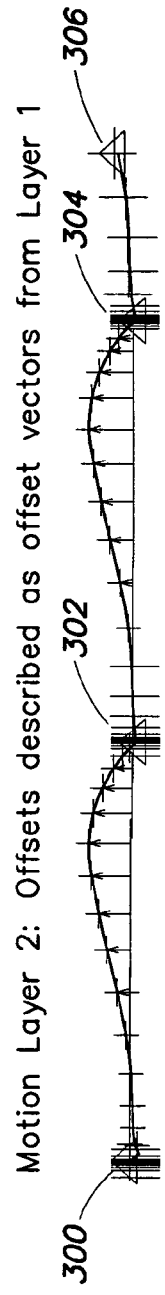
FIG. 7 Motion Layer 2: Offsets described as offset vectors from Layer 1
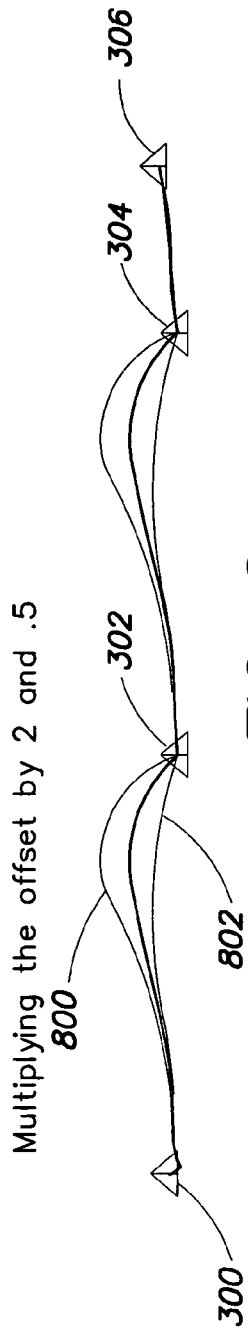
FIG. 8 Multiplying the offset by 2 and .5

MANIPULATION OF MOTION DATA IN AN ANIMATION EDITING SYSTEM

RELATED APPLICATIONS

This application is a continuation of prior application Ser. No. 10/264,173, filed Oct. 3, 2002, now U.S. Pat. No. 6,806,879 which is pending, and claims the benefit of prior filed provisional application No. 60/330,136, filed Oct. 17, 2001, both of which are incorporated herein by reference.

BACKGROUND

A common problem in animation is creating animated characters that move along a specified path. There are several ways to specify this kind of motion. One way is to use motion capture data. Another way is to specify a series of key frames to describe the motion using a combination of inverse and forward kinematics and character rigging techniques.

In both motion capture and dense key frame animation, it can be difficult to visually edit motion that shifts between being locked at a single point in space and being in motion. The most common example of this scenario is way a foot locks to a position on the ground, accelerates to step forward and then decelerates to a new locked position. This problem is particularly acute when the animation is defined using motion capture data. For example, an animator may have a motion capture data representing a person walking. Repositioning where the character is stepping is currently a great deal of work, and typically requires laborious manual editing or offsetting of motion curves.

FIG. 1 illustrates the typical problem. The motion capture data represents a character walking, shown over time with the line 100. The animator desires to reposition the character's feet over time, for example to the line 102 by manipulating the motion capture data. This task of editing the motion capture data for repositioning the character typically requires a lot of work.

Current solutions to this problem include describing original motion capture rotation information in reference to a path and blending in foot stepping positions only at points where the foot is in contact with the ground. The foot contact positions are introduced as a secondary layer. Such a solution is described in "Motion Editing with Spacetime Constraints," by Michael Gleicher, in *Proceedings of the* 1997 *Symposium on Interactive* 3*D Graphics* and related work.

SUMMARY

The problem of editing motion data can be solved by providing a way to specify control points (herein called "handles") along the path of the motion data and to describe the motion data as a combination of layers of information in relationship to these handles.

For example, a first layer may describe, for each point in the motion data, the distance of the point between the handles. For example, a path between two handles may be defined. Each point in the motion data is closest to a point along that path, which may be called a reference point. That point along the line has a distance to the two handles. These distances may be defined as a percentage of the length of the path. A second layer may describe the offset of points in the motion data from the line between the two handles.

In one embodiment, the handles may be identified by the animator either by spatial position, timing or a combination of the two. In another embodiment, the handles may be identified automatically, for example, at predetermined intervals in the motion data or by identifying points where motion stops, changes course, or dips below a minimum velocity.

To edit an animation using the motion data, an animator simply can manipulate the handles in three-dimensional space and/or manipulate the offsets.

Thus, by describing motion as a series of connecting handles, and a combination of layers describing distances and offsets along a path between the handles, the motion data can be easily modified using a graphical user interface that allows an animator to reposition the handles and modify the offsets.

BRIEF DESCRIPTION OF THE DRAWINGS

FIG. 6 is an illustration of offsets from handle blend to target position;

FIG. 7 is an illustration of offsets described as vectors from the path between handles;

FIG. 8 is an illustration of the effect of scaling the offsets in FIGS. 6 and 7;

DETAILED DESCRIPTION

Figure 2:
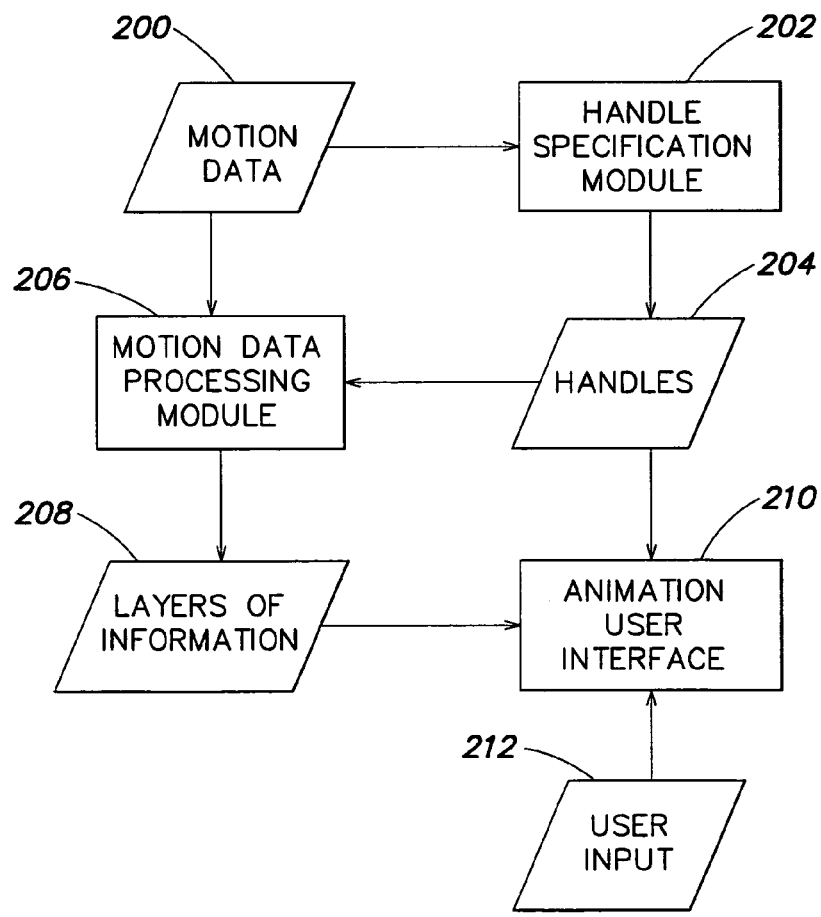
FIG. 2 is a data flow diagram of an animation system that manipulates motion data.

Referring now to FIG. 2, a data flow diagram of an animation system that manipulates motion data will now be described.

Motion data 200 is received. This motion data may be motion capture data or may be generated using inverse or forward kinematics, or may come from any other source that can provide information about the motion of an object.

The motion data 200 is used by a handle specification module 202. The handle specification module is used to specify control points (herein called "handles" 204) along the path of the motion data. In one embodiment, the handles may be identified by the animator at positions or times selected by the animator through an appropriate interface.

Figure 1:
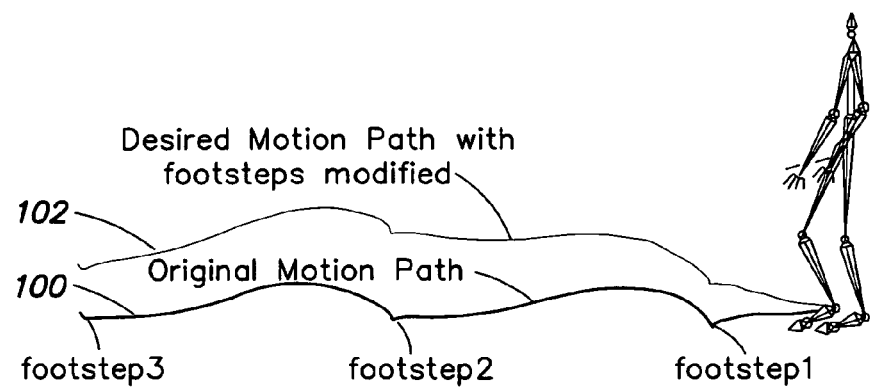
FIG. 1 is an illustration of a typical repositioning problem that arises when creating an animation using motion capture data.
Figure 3:
FIG. 3 is an illustration of the placement of handles on motion data.

In another embodiment, the handles may be identified automatically, for example, at predetermined intervals in the motion data or by identifying points where motion stops, changes course, or dips below a minimum velocity. By detecting where a minimum velocity is reached, handles can be placed to describe the start, end, and stopping/slowing points of motion, such as the footsteps of the character of FIG. 1, and as shown at 300, 302, 304 and 306 in FIG. 3. The handles may be points on a larger curve.

Pseudocode describing an algorithm that may be used to detect the crossing of a minimum velocity is as follows:

```
min_velocity = .1
'cycle through time
for time = start to end
    delta(time) = position difference from last frame
    if delta(time) < min_velocity then
    ' Here we are in the time region of a handle position.
    ' Track this region over time until you exit
    ' the minimum velocity,
    ' and find the lowest delta over this timespan.
    ' The position and rotation values at this time define
    ' the coordinates for a handle.
    end if
next
```

Another approach to achieve similar results could be to analyze the slopes of motion curves to find low velocity, inflection or stepping points.

The handles 204 allow the motion data 200 to be processed by motion data processing module 206 to define the motion data as a combination of layers of information 208 describing the motion in relationship to these handles.

Figure 4:
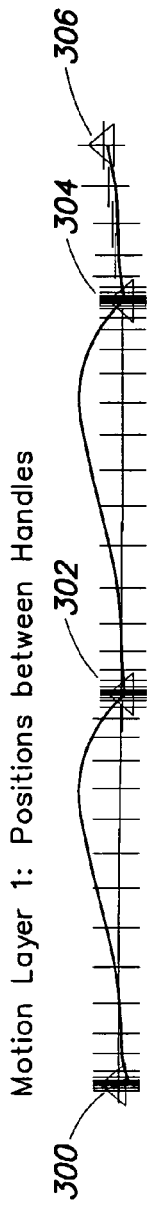
FIG. 4 is an illustration of positions along a path between handles.
Figure 5:
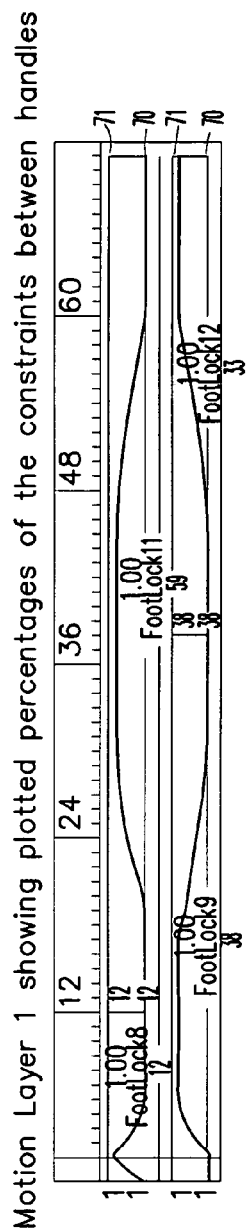
FIG. 5 is an illustration of plotted percentages of constraints between handles.

For example, a first layer may describe, for each point in the motion data, the distance of the point between the handles. For example, a path between two handles may be defined. Each point in the motion data is closest to a point along that path, which may be called a reference point. That point along the line has a distance to the two handles. These distances may be defined as a percentage of the length of the path. This first layer can be understood as a series of overlapping position constraints blending the object between its last stepping point and the next. As a diagram it can be visualized as points in space as shown in FIG. 4, or as plotted curves blending between constraints, as shown in FIG. 5.

A second layer may describe the offset of the motion data from the line between the two handles. This second layer of motion is a layer of offsets from the first layer (the best point to describe the goal between the two handles) to the goal. So the second layers can be thought of as the region shown in FIG. 6, or the series of vectors in space shown in FIG. 7.

Figure 10:
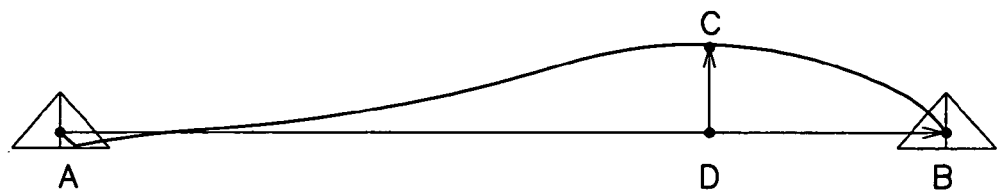
FIG. 10 is an illustration of how offsets and distances may be calculated.
Figure 11:
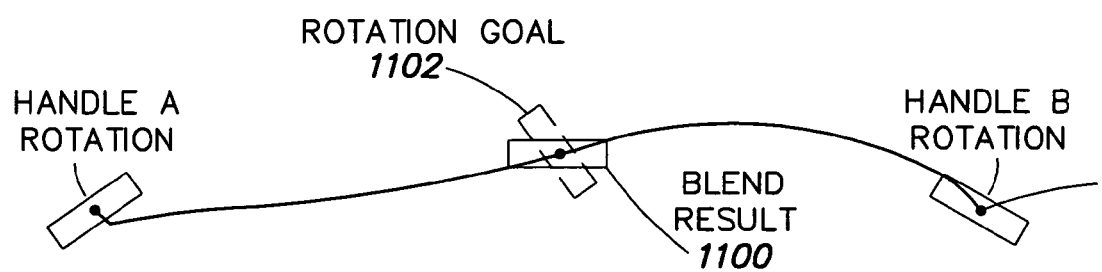
FIG. 11 is an illustration of how rotational information may be handled.

Referring now to FIGS. 10 and 11, the calculation of the information for the first and second layers, and how to handle rotational information, will be described in more detail. In particular, referring to FIG. 10, to describe a point C as a percentage between A and B, $$percentage = \frac{\vec{AB} \cdot \vec{AC}}{|\vec{AB}|}$$

To calculate the offset,

Point $D = A + \vec{AB} *$ percentage, and

Offset $= \vec{DC}$.

Regarding rotational offsets, referring to FIG. 11, to match the rotations in two layers, the first layer is blend results 1100 that come from the position blending curves calculated earlier (and applied to constraints defining both position and orientation). By reusing the same curves and constraints, the process is greatly simplified. The second layer is the offset required to meet the rotation goal 1102 at any given frame. Thus to calculate the second layer:

Inverse(Blend Result)*Rotation Goal=Rotation Offset.

The layers of information 208 and the handles 204 are provided to an animation interface 210 that allows an animator to manipulate these values through user input 212 to author the animation of a character or motion of an object. To edit an animation using the motion data, an animator simply can manipulate the handles in three-dimensional space and/or manipulate the offsets. For example, a character can be manipulated to step higher 800 or lower 802 simply by multiplying the scale of the offset, as shown in FIG. 8. A simple slider can be provided in a graphical user interface to allow a user to modify the offsets, such that:

Multiplied offset=$\vec{DC}$*Slider.

The path followed by the character can be manipulated simply by positioning the handles in three dimensional space. The net result is that it becomes much easier to reposition motion stepping and to deform motion to follow different paths and gaits.

Figure 9:
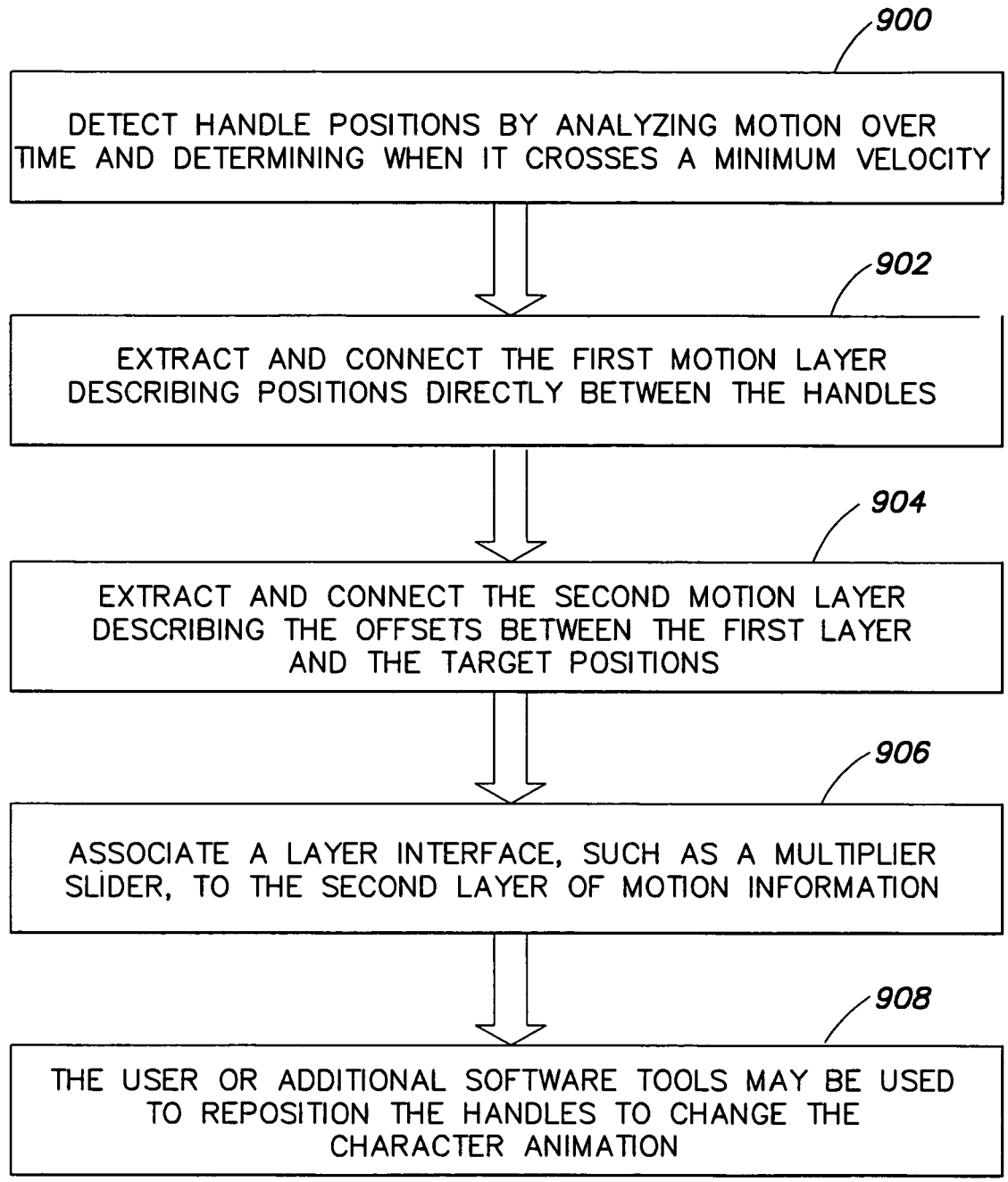
FIG. 9 is a flow chart of a workflow for using an animation system.

Referring now to FIG. 9, a description of a workflow for editing animation by manipulating motion data will now be provided. First, the handles are specified at 900, for example by analyzing motion over time to determine when it crosses a minimum velocity so as to detect the handle positions automatically. The first motion layer describing positions between the handles is extracted 902. The second motion layer describing offsets between the first layer and target positions in the motion data is extracted 904. The information about the handles and extracted motion layers may be stored for later use or transferred to another animation system for use. The animation system associates a user interface, such as a multiplier slider, with the second layer of motion information (the offsets) 906 to allow manipulation of the offsets to specify an animation. The user or an animation tool may reposition the handles to change the animation at 908.

Thus, by describing motion as a series of connecting handles, and a combination of layers describing distances and offsets along a path between the handles, the motion data can be easily modified using a graphical user interface that allows an animator to reposition the handles and modify the offsets. In particular, the handles can be manipulated in the same manner as any other three-dimensional objects, by applying constraints, by using character rigging techniques, by applying deformations, etc., similar to other fundamental building blocks of three-dimensional animation such as skeletons or paths. The ability to modify large volumes of motion capture quickly can be used to create film and video games more efficiently. It is also useful for allowing character motion to be easily be deformed and modified spatially.

The animation system described above may be implemented in a number of ways, such as by using a computer program written in a conventional computer programming language for compilation and execution on a general purpose computer having conventional mechanical and graphical user interfaces, input and output devices, and temporary and permanent computer readable storage.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer program product, comprising:
a computer readable medium have computer program instructions stored thereon which, when interpreted by a computer, instruct the computer to perform a process for editing motion data for animating a character, comprising:
receiving information specifying a plurality of handles in the motion data;
for points in the motion data between a pair of the specified handles:
computing a value representing a distance of the point along a path between the pair of handles; and
computing a value representing an offset of the point from the path between the pair of handles;
receiving user input to allow a user to manipulate the computed values representing the offsets to specify an animation of the character using the manipulated computed values.

2. The computer program product of claim 1, wherein the information specifying a plurality of handles in the motion data comprises positions at which a minimum velocity is represented by the motion data.

3. The computer program product of claim 1, wherein computing the value representing the distance comprises:
identifying a reference point along the path, wherein the reference point is closest to the point in the motion data; and
computing a first distance between the reference point and a first of the pair of handles.

4. The computer program product of claim 3, wherein computing the value representing the distance further comprises:
computing a second distance between the reference point and a second of the pair of handles.

5. The computer program product of claim 4, wherein computing the value representing the distance further comprises:
computing the first distance as a percentage of a distance between the pair of handles.

6. The computer program product of claim 5, wherein computing the value representing the distance further comprises:
computing the second distance as a percentage of the distance between the pair of handles.

7. The computer program product of claim 4, wherein computing the value representing the distance further comprises:
computing the second distance as a percentage of a distance between the pair of handles.

8. The computer program product of claim 3, wherein computing the value representing the distance further comprises:
computing the first distance as a percentage of a distance between the pair of handles.

9. The computer program product of claim 1, wherein computing the value representing the offset comprises:
identifying a reference point along the path, wherein the reference point is closest to the point in the motion data; and
computing an offset between the reference point and the point in the motion data.

10. An animation system for editing motion data for animating a character, comprising:
means for accessing information specifying a plurality of handles in the motion data;
means for determining, for points in the motion data between a pair of the specified handles, a value representing a distance of the point along a path between the pair of handles; and
means for determining, for points in the motion data between a pair of the specified handles, a value representing an offset of the point from the path between the pair of handles; and
means for processing user input to allow a user to manipulate the computed values representing the offsets to specify an animation of the character using the manipulated computed values.

11. The animation system of claim 10, wherein the information specifying a plurality of handles in the motion data comprises positions at which a minimum velocity is represented by the motion data.

12. The animation system of claim 10, wherein the means for determining the value representing the distance comprises:
means for identifying a reference point along the path, wherein the reference point is closest to the point in the motion data; and
means for determining a first distance between the reference point and a first of the pair of handles.

13. The animation system of claim 12, wherein the means for determining the value representing the distance further comprises:
means for determining a second distance between the reference point and a second of the pair of handles.

14. The animation system of claim 13, wherein the means for determining the value representing the distance further comprises:
means for determining the first distance as a percentage of a distance between the pair of handles.

15. The animation system of claim 14, wherein the means for determining the value representing the distance further comprises:
means for determining the second distance as a percentage of the distance between the pair of handles.

16. The animation system of claim 13, wherein the means for determining the value representing the distance further comprises:
means for determining the second distance as a percentage of a distance between the pair of handles.

17. The animation system of claim 12, wherein the means for determining the value representing the distance further comprises:
means for determining the first distance as a percentage of a distance between the pair of handles.

18. The animation system of claim 10, wherein the means for determining the value representing the offset comprises:
means for identifying a reference point along the path, wherein the reference point is closest to the point in the motion data; and
means for determining the offset between the reference point and the point in the motion data.

19. An animation system for enabling editing and animation of a character using motion data and information specifying a plurality of handles in the motion data, comprising:
a motion data processing module that computes, for points in the motion data between a pair of the specified handles, a value representing the distance of the point along a path between the pair of handles, and that computes, for points in the motion data between a pair of the specified handles, a value representing the offset of the point from the path between the pair of handles; and an animation user interfaces that receives user input to allow a user to manipulate the computed values representing the offsets to specify an animation of the character using the manipulated computed values.

20. The animation system of claim 19, wherein the information specifying a plurality of handles in the motion data comprises positions at which a minimum velocity is represented by the motion data.

21. The animation system of claim 19, wherein the motion data processing module comprises:
means for identifying a reference point along the path, wherein the reference point is closest to the point in the motion data; and
means for determining a first distance between the reference point and a first of the pair of handles.

22. The animation system of claim 21, wherein the motion data processing module comprises:
means for determining a second distance between the reference point and a second of the pair of handles.

23. The animation system of claim 22, wherein the motion data processing module comprises:
means for determining the first distance as a percentage of a distance between the pair of handles.

24. The animation system of claim 23, wherein the motion data processing module comprises:
means for determining the second distance as a percentage of the distance between the pair of handles.

25. The animation system of claim 22, wherein the motion data processing module comprises:
means for determining the second distance as a percentage of a distance between the pair of handles.

26. The animation system of claim 21, wherein the motion data processing module comprises:
means for determining the first distance as a percentage of a distance between the pair of handles.

27. The animation system of claim 19, wherein the motion data processing module comprises:
means for identifying a reference point along the path, wherein the reference point is closest to the point in the motion data; and
means for determining the offset between the reference point and the point in the motion data.

28. A process for editing motion data for animating a character, comprising:
receiving information specifying a plurality of handles in the motion data;
for points in the motion data between a pair of the specified handles:
computing a value representing a distance of the point along a path between the pair of handles; and
computing a value representing an offset of the point from the path between the pair of handles;
receiving user input to allow a user to manipulate the handles to specify an animation of the character using the computed values and the manipulated handles.

29. The process of claim 28, wherein the information specifying a plurality of handles in the motion data comprises positions at which a minimum velocity is represented by the motion data.

30. The process of claim 28, wherein computing the value representing the distance comprises:
identifying a reference point along the path, wherein the reference point is closest to the point in the motion data; and
computing a first distance between the reference point and a first of the pair of handles.

31. The process of claim 30, wherein computing the value representing the distance further comprises:
computing a second distance between the reference point and a second of the pair of handles.

32. The process of claim 31, wherein computing the value representing the distance further comprises:
computing the first distance as a percentage of a distance between the pair of handles.

33. The process of claim 32, wherein computing the value representing the distance further comprises:
computing the second distance as a percentage of the distance between the pair of handles.

34. The process of claim 31, wherein computing the value representing the distance further comprises:
computing the second distance as a percentage of a distance between the pair of handles.

35. The process of claim 30, wherein computing the value representing the distance further comprises:
computing the first distance as a percentage of a distance between the pair of handles.

36. The process of claim 28, wherein computing the value representing the offset comprises:
identifying a reference point along the path, wherein the reference point is closest to the point in the motion data; and
computing the offset between the reference point and the point in the motion data.

37. A computer program product, comprising:
a computer readable medium have computer program instructions stored thereon which, when interpreted by a computer, instruct the computer to perform a process for editing motion data for animating a character, comprising:
receiving information specifying a plurality of handles in the motion data;
for points in the motion data between a pair of the specified handles:
computing a value representing a distance of the point along a path between the pair of handles; and
computing a value representing an offset of the point from the path between the pair of handles;
receiving user input to allow a user to manipulate the handles to specify an animation of the character using the computed values and the manipulated handles.

38. The computer program product of claim 37, wherein the information specifying a plurality of handles in the motion data comprises positions at which a minimum velocity is represented by the motion data.

39. The computer program product of claim 37, wherein computing the value representing the distance comprises:
identifying a reference point along the path, wherein the reference point is closest to the point in the motion data; and
computing a first distance between the reference point and a first of the pair of handles.

40. The computer program product of claim 39, wherein computing the value representing the distance further comprises:
computing a second distance between the reference point and a second of the pair of handles.

41. The computer program product of claim 40, wherein computing the value representing the distance further comprises:
computing the first distance as a percentage of a distance between the pair of handles.

42. The computer program product of claim 41, wherein computing the value representing the distance further comprises:
computing the second distance as a percentage of the distance between the pair of handles.

43. The computer program product of claim 40, wherein computing the value representing the distance further comprises:
computing the second distance as a percentage of a distance between the pair of handles.

44. The computer program product of claim 39, wherein computing the value representing the distance further comprises:
computing the first distance as a percentage of a distance between the pair of handles.

45. The computer program product of claim 37, wherein computing the value representing the offset comprises:
identifying a reference point along the path, wherein the reference point is closest to the point in the motion data; and
computing the offset between the reference point and the point in the motion data.

46. A process for manipulating motion data for editing motion data for animating a character, comprising:
receiving information specifying a plurality of handles in the motion data;
for points in the motion data between a pair of the specified handles:
computing a value representing a distance of the point along a path between the pair of handles; and
computing a value representing an offset of the point from the path between the pair of handles;
storing the computed values in a computer readable medium for editing and animation of the character using the motion data.

47. The process of claim 46, wherein the information specifying a plurality of handles in the motion data comprises positions at which a minimum velocity is represented by the motion data.

48. The process of claim 46, wherein computing the value representing the distance comprises:
identifying a reference point along the path, wherein the reference point is closest to the point in the motion data; and
computing a first distance between the reference point and a first of the pair of handles.

49. The process of claim 48, wherein computing the value representing the distance further comprises:
computing a second distance between the reference point and a second of the pair of handles.

50. The process of claim 49, wherein computing the value representing the distance further comprises:
computing the first distance as a percentage of a distance between the pair of handles.

51. The process of claim 50, wherein computing the value representing the distance further comprises:
computing the second distance as a percentage of the distance between the pair of handles.

52. The process of claim 49, wherein computing the value representing the distance further comprises:
computing the second distance as a percentage of a distance between the pair of handles.

53. The process of claim 48, wherein computing the value representing the distance further comprises:
computing the first distance as a percentage of a distance between the pair of handles.

54. The process of claim 46, wherein computing the value representing the offset comprises:
identifying a reference point along the path, wherein the reference point is closest to the point in the motion data; and
computing the offset between the reference point and the point in the motion data.

55. A computer program product, comprising:
a computer readable medium have computer program instructions stored thereon which, when interpreted by a computer, instruct the computer to perform a process for editing motion data for animating a character, comprising:
receiving information specifying a plurality of handles in the motion data;
for points in the motion data between a pair of the specified handles:
computing a value representing the distance of the point along a path between the pair of handles; and
computing a value representing the offset of the point from the path between the pair of handles;
storing the computed values in computer readable form for editing and animation of the character using the motion data.

56. The computer program product of claim 55, wherein the information specifying a plurality of handles in the motion data comprises positions at which a minimum velocity is represented by the motion data.

57. The computer program product of claim 55, wherein computing the value representing the distance comprises:
identifying a reference point along the path, wherein the reference point is closest to the point in the motion data; and
computing a first distance between the reference point and a first of the pair of handles.

58. The computer program product of claim 57, wherein computing the value representing the distance further comprises:
computing a second distance between the reference point and a second of the pair of handles.

59. The computer program product of claim 58, wherein computing the value representing the distance further comprises:
computing the first distance as a percentage of a distance between the pair of handles.

60. The computer program product of claim 59, wherein computing the value representing the distance further comprises:
computing the second distance as a percentage of the distance between the pair of handles.

61. The computer program product of claim 58, wherein computing the value representing the distance further comprises:
computing the second distance as a percentage of a distance between the pair of handles.

62. The computer program product of claim 57, wherein computing the value representing the distance further comprises:
computing the first distance as a percentage of a distance between the pair of handles.

63. The computer program product of claim 55, wherein computing the value representing the offset comprises:
identifying a reference point along the path, wherein the reference point is closest to the point in the motion data; and
computing the offset between the reference point and the point in the motion data.

64. A process for enabling animation of a character using edited motion data, comprising:

receiving information specifying a plurality of handles in the motion data, values representing distance of points in the motion data along a path between a pair of the handles and values representing offsets of points in the motion data from the path between the pair of the handles;

receiving user input to allow a user to manipulate the received information to specify an animation of the character; and rendering the specified animation of the character using the manipulated received information, wherein the information specifying a plurality of handles in the motion data comprises positions at which a minimum velocity is represented by the motion data.

65. A computer program product, comprising:

a computer readable medium have computer program instructions stored thereon which, when interpreted by a computer, instruct the computer to perform a process for enabling animation of a character using edited motion data, comprising:

receiving information specifying a plurality of handles in the motion data, values representing distance of points in the motion data along a path between a pair of the handles and values representing offsets of points in the motion data from the path between the pair of the handles;

receiving user input to allow a user to manipulate the received information to specify an animation of the character; and rendering the specified animation of the character using the manipulated received information;

wherein the information specifying a plurality of handles in the motion data comprises positions at which a minimum velocity is represented by the motion data.

66. An animated work on a medium containing a plurality of images, produced by the process of:

receiving information specifying a plurality of handles in the motion data, values representing distance of points in the motion data along a path between a pair of handles and values representing offsets of points in the motion data from the path between the pair of handles;

providing a user interface to allow a user to manipulate the received information to specify an animation of the character;

rendering the specified animation of the character using the manipulated received information; and manipulating the medium to contain the rendered plurality of images representing the animated work;

wherein the information specifying a plurality of handles in the motion data comprises positions at which a minimum velocity is represented by the motion data.

* * * * *